C. BERGENER.
TUBULAR LANTERN.
APPLICATION FILED FEB. 1, 1911.
1,041,411.
Patented Oct. 15, 1912.
2 SHEETS—SHEET 1.
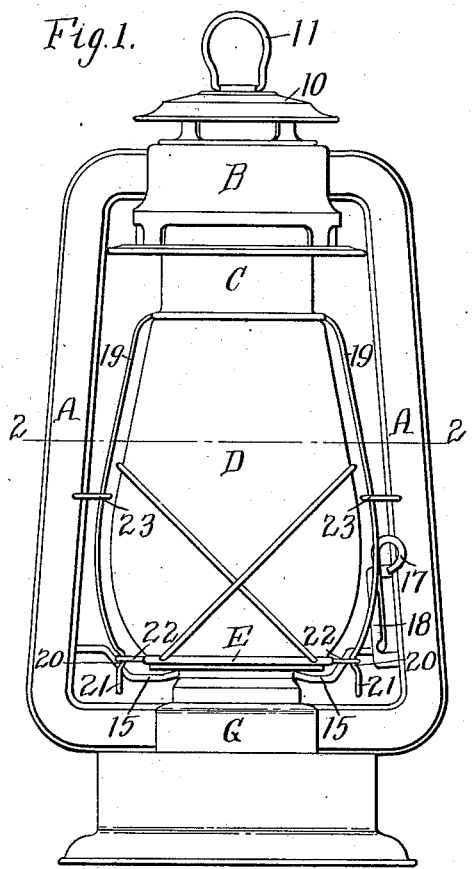
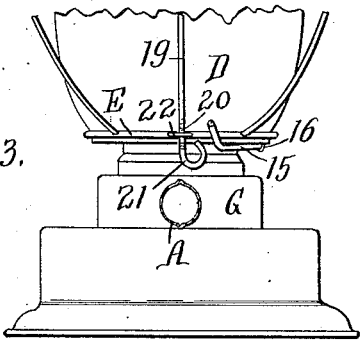
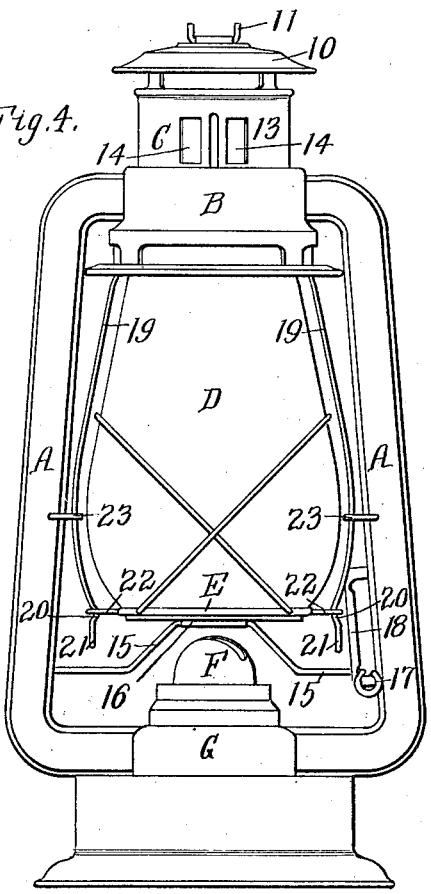
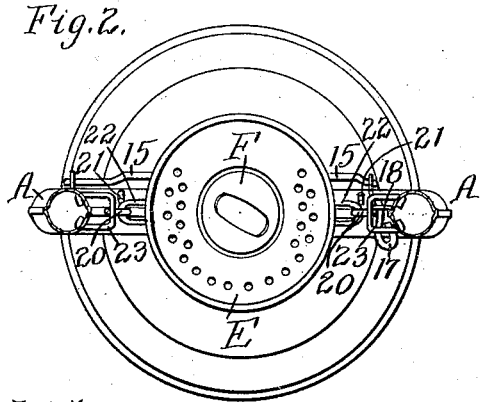
Witnesses:
C. A. Bund.
A. G. Dimond.
Inventor:
Charles Bergener,
By Wilhelm, Parker & Hardy
Attorneys.

C. BERGENER.
TUBULAR LANTERN.
APPLICATION FILED FEB. 1, 1911.
1,041,411.
Patented Oct. 15, 1912.
2 SHEETS—SHEET 2.
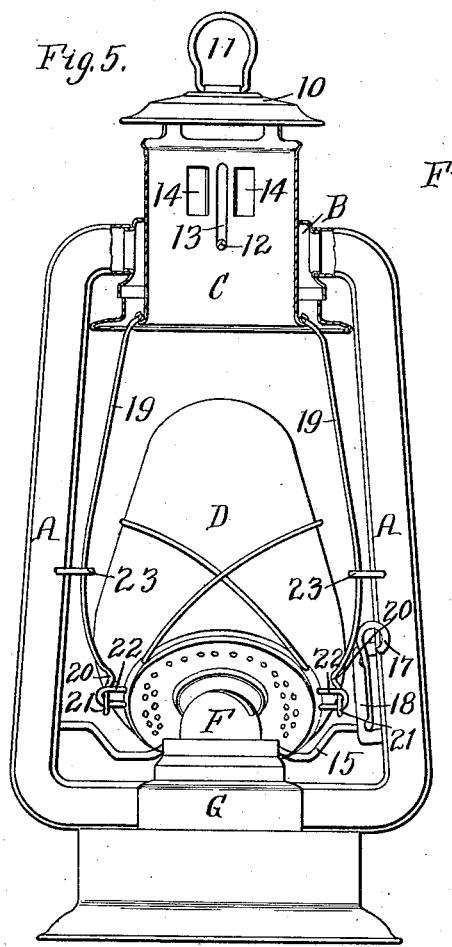
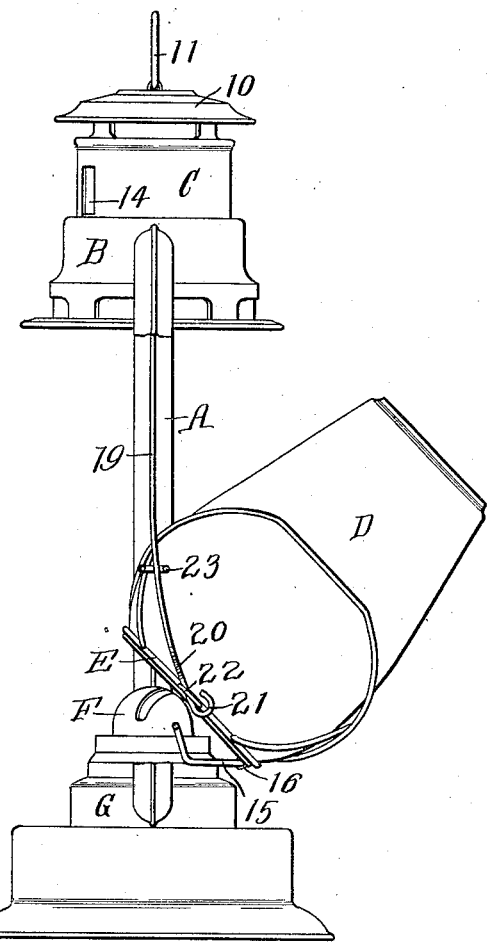
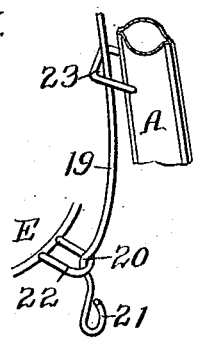
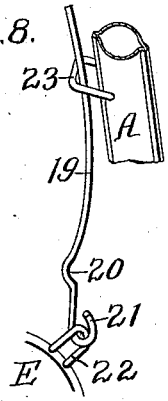
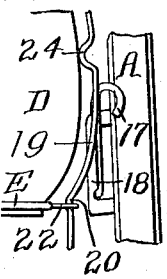
Witnesses:
C. H. Bund.
A. G. Dimond.
Inventor:
Charles Bergener,
By Wilhelm, Parker & Hard,
Attorneys.

UNITED STATES PATENT OFFICE.

CHARLES BERGENER, OF ROCHESTER, NEW YORK, ASSIGNOR TO C. T. HAM MANUFACTURING COMPANY, OF ROCHESTER, NEW YORK.

TUBULAR LANTERN.

1,041,411.  Specification of Letters Patent.  Patented Oct. 15, 1912.

Application filed February 1, 1911. Serial No. 605,997.

*To all whom it may concern:*

Be it known that I, CHARLES BERGENER, a citizen of the United States, residing at Rochester, in the county of Monroe and State of New York, have invented a new and useful Improvement in Tubular Lanterns, of which the following is a specification.

This invention relates to that class of lanterns in which the plate upon which the globe rests can be raised from the burner for giving access to the latter, and in which the globe is removably held upon this plate by a vertically movable holder or chimney which bears upon the upper end of the globe.

The object of the invention is to provide simple and convenient means for raising the top holder or chimney from the globe and at the same time tilting the globe plate, thereby swinging the globe from underneath the holder or chimney and presenting the globe plate in a position which facilitates the removal of the globe from the plate and the replacement of the globe on the same.

In the accompanying drawings, consisting of two sheets: Figure 1 is a front elevation of a tubular lantern embodying this invention, with the globe plate and globe in the normal position. Fig. 2 is a horizontal section in line 2—2, Fig. 1. Fig. 3 is a sectional elevation of the lower part of the lantern at right angles to Fig. 1. Fig. 4 is a front elevation of the lantern, showing the globe, globe plate and top holder raised. Fig. 5 is a similar view, showing the top holder raised from the globe and the latter and the globe plate tilted. Fig. 6 is a side elevation of the lantern in this position of the parts, with part of one tube removed. Figs. 7 and 8 are fragmentary perspective views of the sliding connection between the side rods and globe plate in different positions. Fig. 9 is a fragmentary front elevation, showing a modified construction of one of the side rods.

Like reference characters refer to like parts in the several figures.

The lantern illustrated in the drawings is of the well known cold-blast type in which outside air for the support of the flame enters an air chamber which surrounds a chimney or globe holder bearing upon the upper end of the globe, this upper air chamber being secured to the tubes and forming part of the rigid lantern frame and the chimney or holder being vertically movable within this air chamber toward and from the globe.

A represents the tubes, B the annular upper air chamber secured to the upper ends thereof, C the chimney or globe holder arranged within the air chamber and movable vertically therein, D the globe, E the plate on which the globe rests, F the burner, and G the lower air chamber on which the burner rests and which is connected with the lower ends of the tubes. The chimney or top holder C is provided with a cap 10 having a ring or loop 11 for manipulating the chimney and is guided in the air chamber by a cross wire 12 passing through upright slots 13 in the holder. The chimney is also provided with the usual air openings 14. All of these parts may be of any well known or suitable construction.

The globe plate E is connected to a lifting mechanism of any suitable construction which preferably comprises a transverse lifter shaft 15 journaled on the lantern frame and pivotally connected with the plate in rear of the burner by a transverse sleeve 16. The shaft is provided with an arm or lever 17 which engages a catch plate 18 on the inner side of one of the tubes.

19 represents side rods or wires which are secured with their upper ends to the chimney or holder C and are slidably connected with the globe plate E. These rods engage with the plate at one of two points, one above the other, by means of shiftable engaging devices; at the upper point when the holder bears upon the globe and holds the latter upon the plate, and at the lower point when the holder has been raised from the globe. The upper point of engagement is formed by a bend, or rounded shoulder, or indentation 20 formed in the rod near the end thereof, and the lower point of engagement is formed by a hook 21 formed at the end of the rod. The lower ends of the rods engage in loops 22 projecting laterally from the globe plate and the rods are sufficiently elastic to hold their lower ends yieldingly in engagement with these loops with an outward spring pressure. The outward tension or pressure can be increased by loops 23 which are secured to the inner sides of the tubes and through which the rods pass, Figs. 1, 4 and 5, or by bends 24, Fig. 9, which are so formed on the rods as to bear against the globe. These loops or bends deflect the lower ends of the rods outwardly and hold the lower portions of the rods against the loops of the globe plate.

When the parts are in their normal position, Figs. 1 and 3, the chimney or top holder C rests upon the globe, the globe plate rests upon the burner, the side rods engage the loops of the globe plate by the bends or indentations 20, and the hooks 21 stand below these loops.

When the globe and globe plate are to be raised from the burner for giving access to the same, the lifter shaft is manipulated by means of the lever arm 17 so as to raise the plate and the globe resting thereon. This upward movement of the plate also raises the top holder through the side rods which still remain engaged with the globe plate by the indentations 20, Fig. 4. When the globe is to be removed from the globe plate, the parts being in the normal position, shown in Fig. 1, the top holder is raised by means of the hand ring 11. The first part of this upward movement causes the lower portions of the side rods to move upwardly in the loops of the globe plate, disengaging the bends 20 of the rods from the loops and engaging the hooks 21 with the latter, thus lengthening the rods and raising the holder above the top of the globe. The further upward movement of the holder swings the globe plate on the hinge by which it is connected with the lifter shaft and tilts the globe plate and the globe backwardly, Figs. 5 and 6, since the side rods are connected with the globe plate forwardly of this hinge. This places the globe plate and globe in a convenient position for withdrawing the globe from the guard 25 on the globe plate by which the globe is releasably held on the plate.

For inserting the globe the latter is placed within the guard with the plate in the tilted position, the plate is swung to the horizontal position, and the top holder pushed down upon the globe until the indentations 20 are again engaged with the loops of the plate.

The globe is securely held in its normal position by the lifter arm 17 engaging the catch plate 18 and the spring usually employed for pressing the top holder downwardly is rendered unnecessary, whereby the lantern is simplified and the height of the upper air chamber and top holder can be reduced.

I claim as my invention:

1. The combination of a lantern frame, a tilting globe plate, a top globe holder capable of up and down movement in said frame, and connecting rods secured to said top holder and having devices for engagement with said tilting plate arranged at different levels, substantially as set forth.

2. The combination of a lantern frame, a tilting globe plate provided with means for releasably holding the globe thereon, a top globe holder capable of up and down movement in said frame, and connecting rods secured to said top holder and having devices for engagement with said tilting plate arranged at different levels, substantially as set forth.

3. The combination of a lantern frame, a globe plate, lifting mechanism for raising and lowering said plate in said frame, a pivotal connection between said plate and said lifting mechanism, a top globe holder capable of up and down movement in said frame, and connecting rods secured to said top holder and having devices for engagement with said tilting plate arranged at different levels, substantially as set forth.

4. The combination of a lantern frame, a pivoted globe plate provided with means for releasably holding the globe thereon, a top globe holder capable of up and down movement in said frame, and rods secured to said top globe holder and connected with said plate out of line with the pivot thereof, whereby the upward movement of said holder swings said plate on its pivot and moves the upper end of the globe from under said globe holder, substantially as set forth.

5. The combination of a lantern frame, a pivoted globe plate, a top globe holder capable of up and down movement in said frame, and connecting rods secured to said top holder and connected with said plate out of line with the pivot thereof by shiftable connections one above the other, whereby the upward movement of said holder first raises the latter from the globe and then swings the plate on its pivot, substantially as set forth.

6. The combination of a lantern frame, a pivoted globe plate, a top globe holder capable of up and down movement in said frame, and connecting means secured to said holder and having shiftable engagement with said plate at two points one above the other and out of line with the pivot thereof, substantially as set forth.

7. The combination of a lantern frame, a pivoted globe plate, a top globe holder capable of up and down movement in said frame, and connecting rods secured to said holder and provided at their lower ends with devices for engaging said plate out of line with the pivot thereof, said devices comprising hooks at the lower ends of said rods and shoulders above said hooks, substantially as set forth.

8. The combination of a lantern frame, a top globe holder capable of up and down movement therein, a globe plate, a transverse lifter shaft journaled on said frame, a pivotal connection between said plate and shaft, and connecting rods secured to said holder and provided at their lower ends with devices for engaging said plate out of line with the pivot thereof, said devices comprising hooks at the lower ends of said rods and shoulders above said hooks, substantially as set forth.

9. The combination of a lantern frame, a top globe holder capable of up and down movement therein, a pivoted globe plate provided with side loops, elastic connecting rods secured to said holder and arranged with their lower portions in said loops, said rods being provided with engaging devices at different levels, and means for pressing the lower portions of said rods outwardly against said loops, substantially as set forth.

Witness my hand in the presence of two subscribing witnesses.

CHARLES BERGENER.

Witnesses:
 ETTA M. DALE,
 LYMAN S. PHIPPS.

Copies of this patent may be obtained for five cents each, by addressing the "Commissioner of Patents, Washington, D. C."